Figure 1:
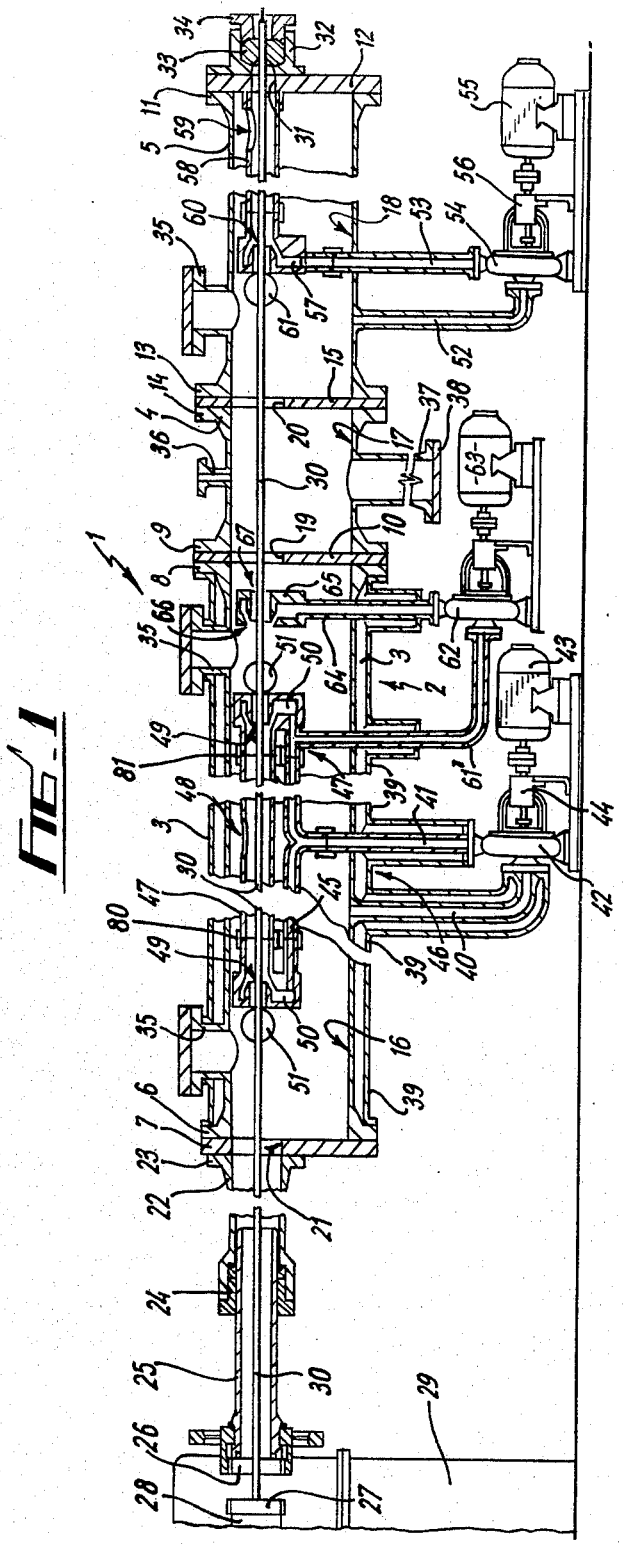

United States Patent [19]

Hill et al.

[11] 4,356,143

[45] Oct. 26, 1982

[54] APPARATUS FOR AND A METHOD OF CURING A CONTINUOUS LENGTH OF CURABLE MATERIAL

[75] Inventors: Alan H. Hill, Bury; Alan Lord, Bacup, both of England

[73] Assignee: General Engineering Radcliffe 1979 Limited, Manchester, England

[21] Appl. No.: 241,884

[22] Filed: Mar. 9, 1981

[51] Int. Cl.³ .............................................. B29F 3/08
[52] U.S. Cl. .................................... 264/557; 264/37; 264/561; 264/562; 264/236; 264/347; 425/71; 425/445
[58] Field of Search .................. 264/347, 236, 37, 557, 264/561, 562; 425/71, 445

[56] References Cited

U.S. PATENT DOCUMENTS

| | | | |
|---|---|---|---|
| 1,661,888 | 3/1928 | Fisher | 264/347 |
| 1,740,029 | 12/1929 | Moomy | 425/71 |
| 2,287,830 | 6/1942 | Postlewaite | 425/71 |
| 3,794,705 | 2/1974 | Harley | 264/37 |
| 4,029,450 | 6/1977 | Caser | 425/445 |
| 4,178,968 | 12/1979 | Attilio | 264/347 |
| 4,179,256 | 12/1979 | Tomioka et al. | 425/71 |

Primary Examiner—Jeffery R. Thurlow
Attorney, Agent, or Firm—Ladas & Parry

[57] ABSTRACT

In an apparatus and a method for the curing of a continuous length of curable material, the length of material is passed through a curing chamber defined by a tubular body 47. This body 47 is disposed in the upper part of another heated tubular body 2 which contains a heat exchange liquid. This liquid is fed to one or more injectors disposed at one or both ends of the body 47, injected along the chamber and then allowed to drain back therefrom into the body 2. The body 2 contains a further tubular body 58 downstream of and partitioned from the tubular body 47. Body 58 also has an injector 60 through which water is injected to cool the length of material. Tubular body 47 may be provided with drain holes through which heat exchange liquid can be quickly drained at the end of a curing run. It may also be provided with air vents or a longitudinal slot in its upper part to release trapped air. Devices for wiping heat exchange liquid clinging to the cured material on emergence from the curing chamber are also provided. With this relatively compact arrangement curing may be achieved while thermal stresses in the apparatus are reduced.

24 Claims, 8 Drawing Figures

APPARATUS FOR AND A METHOD OF CURING A CONTINUOUS LENGTH OF CURABLE MATERIAL

This invention concerns apparatus for and a method of curing a continuous length of curable material.

In particular, this invention concerns a system using, inside a curing chamber, a heat exchange liquid consisting of molten salts in order to cure under pressure conditions, drawn, moulded, compact, foamy or rolled articles in elastomeric materials and in particular those made up of pipes, coating of insulated cables directly extruded on leads to be insulated.

For simplicity, the following description shall cover only the development of coated electric cables.

U.S. Pat. No. 4,029,450 registered on Apr. 18, 1975, describes the continuous curing, under pressure conditions, of an elastomeric coating of a metal wire. The coated wire is fed continuously along a tubular duct which is heated on the outside and which comprises a central part consisting of a curing chamber. A heat exchange liquid is fed into this chamber, usually molten salt, by means of the annular nozzle of a tubular ejector through which the coated wire passes.

The curing chamber is connected at its two ends by means of two pipes to a heated vessel consisting of a container for the heat exchange liquid which is drawn from the vessel by a pump and then delivered to the tubular ejector through a heated pipe.

The apparatus or system described above, although perfectly functional, has however some disadvantages due, mainly to the fact that it requires, in order to operate a considerable amount of heat. In fact, in the system as described above, it is necessary to heat individually the vessel containing the heat exchange liquid and the curing chamber, and also all the connecting pipes where the liquid runs, since the curing chamber and the vessel are separated. Because of this structural feature, we also have considerable differences in temperature between the parts where the liquid runs and those which are not touched by the liquid. These differences in temperature result in considerable thermal stresses which could cause, after a while, deformations in the tubular duct along which the sheathed wire to be cured is fed. In addition, at high velocity of the length of material there is a marked tendency for heat exchange liquid to cling to the length of material on emergence from the curing chamber. This liquid is carried over into and contaminates coolant for cooling the cured material.

The purpose of this invention is to develope a curing system in which these disadvantages are either reduced or eliminated.

According to one aspect of the present invention, there is provided apparatus for curing a continuous length of curable material comprising a first tubular body which defines a chamber for a heating exchange liquid, a second tubular body disposed inside the first tubular body and defining a curing chamber, inlet means leading into the tubular bodies, and outlet means leading from the tubular bodies arranged to permit a length of material to be cured to pass through the tubular bodies, first and second sealing means placed upstream and downstream respectively of the inlet and outlet means and operative to sealingly cooperate with a length of material, at least one tubular injector for injecting a heat exchange liquid into said second tubular body, a nozzle disposed downstream of the or each injector and adjacent the exit from and coaxial with the curing chamber operative to direct heat exchange liquid fed to it against the length of curable material as it leaves the curing chamber in order to strike heat exchange liquid clinging to the material from its passage through the curing chamber from the material, heat exchange liquid supply means for the supply of heat exchange liquid to the or each tubular injector and the nozzle, means for heating at least a part of the first tubular body, means for feeding a pressurised fluid to the first tubular body and means for cooling the continuous cured length of curable material emerging in operation from the second tubular body.

According to another aspect of the present invention, there is provided apparatus for curing a continuous length of curable material comprising a first tubular body which defines a chamber for a heat exchange liquid, a second tubular body disposed inside the first tubular body and defining a curing chamber, inlet means leading into the tubular bodies, and outlet means leading from the tubular bodies arranged to permit a length of material to be cured to pass through the tubular bodies, first and second sealing means placed upstream and downstream respectively of the inlet and outlet means and operative to sealingly cooperate with a length of material, at least one tubular injector for injecting a heat exchange liquid into said second tubular body, heat exchange liquid supply means for the supply of heat exchange liquid to the or each tubular injector, means for heating at least a part of the first tubular body, means for feeding a pressurised fluid to the first tubular body, means for cooling the continuous cured length of curable material emerging in operation from the second tubular body, and a pulley disposed downstream of the curing chamber and upstream of the means for cooling around which the continuous length of cured material is drawn in operation of the apparatus to change its direction after being cured but before being cooled so as to subject any heat exchange liquid clinging to the material to a centrifugal force tending to throw it from the material.

According to a further aspect of the invention, there is provided a method of curing a continuous length of curable material including the steps of supplying a heat exchange liquid to a first tubular body, pressurising the first tubular body, heating the heat exchange liquid in the first tubular body, feeding the heat exchange liquid from the first tubular body to an injector, injecting the liquid so fed into a second tubular body disposed within the first tubular body, simultaneously passing the continuous length of material through the second tubular body disposed within the first tubular body so that the heat exchange liquid passes over it, allowing the heat exchange liquid to drain back from the second tubular body to the first tubular body, feeding heat exchange liquid to a nozzle disposed at the exit end of the curing chamber and downstream thereof and directing it therefrom at the length of material leaving the chamber in order to strike heat exchange liquid clinging thereto from its passage through the curing chamber from the material, and subsequently cooling the continuous length of material.

According to a still further aspect of the invention, there is provided a method of curing a continuous length of curable material including the steps of supplying a heat exchange liquid to a first tubular body, pressurising the first tubular body, heating the heat exchange liquid in the first tubular body, feeding the head exchange liquid from the first tubular body to an injector, injecting the liquid so fed into a second tubular body disposed within the first tubular body, simultaneously passing the continuous length of material through the second tubular body disposed within the first tubular body so that the heat exchange liquid passes over it, allowing the heat exchange liquid to drain back from the second tubular body to the first tubular body, passing the length of material around a pulley after it exits from the curing chamber so as to change its direction and subject heat exchange liquid clinging to it to a centrifugal force tending to fling it from the material, and subsequently cooling the continuous length of material.

Figure 2:
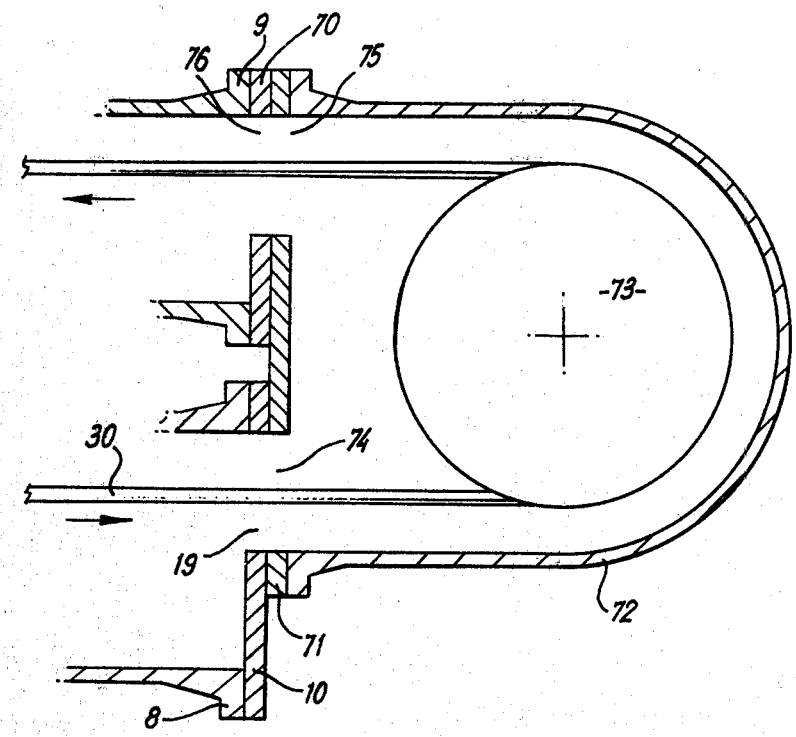
Figure 3A:
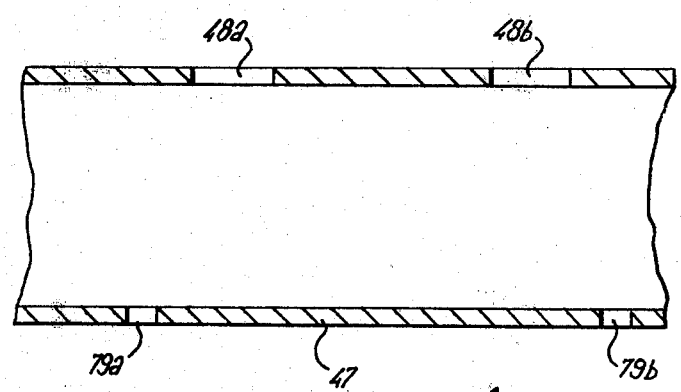
Figure 3B:
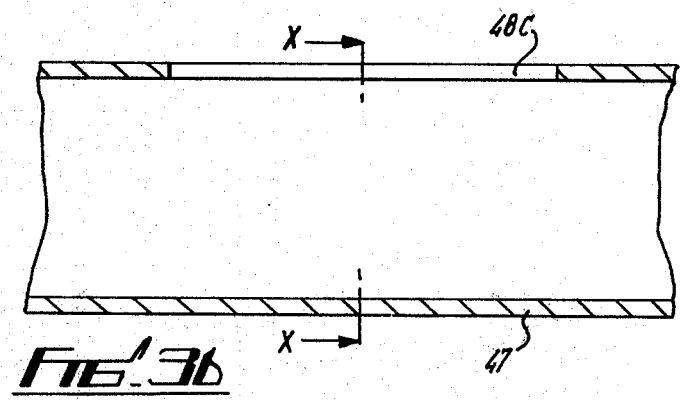
Figure 3C:
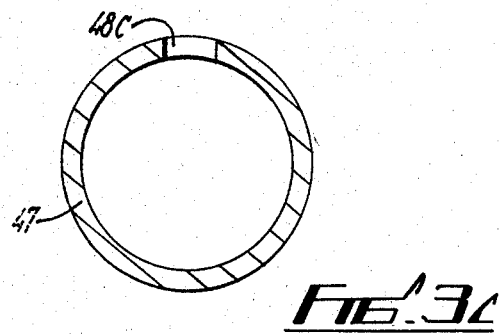
Figure 3D:
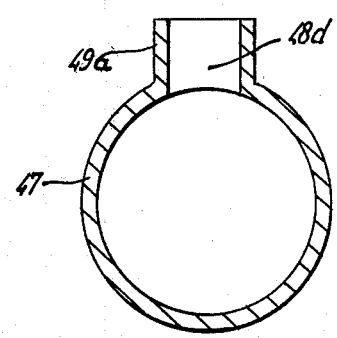
Figure 3E:
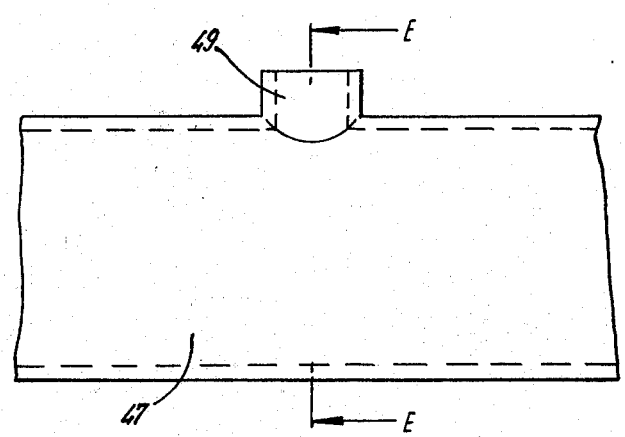
Figure 4:
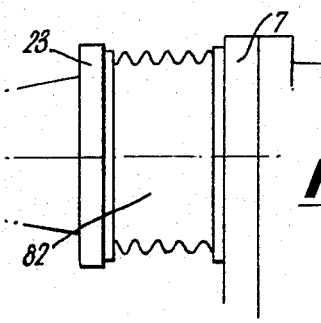

The invention will be described, by way of example, with reference to the accompanying drawings, in which:

FIG. 1 shows an axial view in section of a continuous curing apparatus in accordance with the invention, FIG. 2 shows a modification of the apparatus of FIG. 1, FIGS. 3a to 3e show modifications of the curing chamber of the curing apparatus of FIG. 1, and FIG. 4 shows a modification intended to accommodate thermal stresses between certain parts of the apparatus of FIG. 1.

FIG. 1 shows a curing apparatus or plant indicated as a whole by 1 which comprises a substantially horizontal tubular body 2 made up of three coaxial and integral ducts 3, 4 and 5. In particular, duct 3 has an end flange 6 connected to a sealing plate 7 and an end flange 8 connected to a first end flange 9 of duct 4. A partition plate 10 is disposed between flanges 8 and 9. Duct 5 has a first end flange 11 connected to a sealing plate 12 and a second end flange 13 connected to a second flange 14 at the end of duct 4 by means of a partition plate 15 disposed between flanges 13 and 14. Plates 7, 10, 12 and 15 form, inside ducts 3, 4 and 5, three chambers respectively referenced 16, 17 and 18 which intercommunicate through two holes 19 and 20 respectively in the upper parts of plates 10 and 15 and which are arranged coaxially, with their axes parallel to that of tubular body 2.

A hole 21 is made through plate 7, which is coaxial with holes 19 and 20 and through which chamber 16 is connected to duct 22 fitted with an end flange 23 connected to the external surface of plate 7. The other end of duct 22 is telescopically connected to duct 25 which has a threaded end 26 coupled to threaded end 27 of die 28 of extruder 29. A seal component 24 is disposed between ducts 22 and 25. The extruders 29 and 28 are capable of coating a metal wire with an elastomeric coating to form a coated cable 30, extending along ducts 22 and 25, and tubular body 2 through holes 21, 19 and 20 and which is delivered from tubular body 2 through hole 31 in plate 12, disposed coaxially with holes 19, 20 and 21.

Connected to the outside of plate 12 is a tubular body 32 coaxial with hole 31 and housing an annular element 33 capable of co-operating as a seal with the external surface of cable 30, and which is held in position by a truncated cone-like spigot 34.

Both ducts 3 and 5 are fitted with door-sealed manholes 35, through which inspection of chambers 16 and 18 can be carried out. Duct 4 is fitted on its upper part with a coupling 36 suitable for connection to a pressurised fluid source, this being usually air, and on the lower part with a trap 37 where the bottom is closed by a removable plate 38 and whose upper part communicates with the bottom of chamber 17.

Duct 3 is fitted on the outside with a heated sleeve 39 which also covers two pipes 40 and 41. Pipe 40 leads downwards from the lower part of duct 3 and is connected to the duct at the inlet of a pump 42. Pump 42 is driven through gearing 44 by an electric motor 43. Pipe 41 leads from the outlet of pump 42 upwards and, after having entered chamber 16, forks out into two pipes going in opposite directions parallel to the axis of duct 3, underneath tubular body 47. Tubular body 47 forms a curing chamber for the coated cable 30 arranged coaxially with holes 21 and 19. Tubular body 47 has in its central and upper parts a radial opening 48 and terminates at each end, in an internal truncated conical surface flaring towards the outside and joined to a complementary truncated conical tubular body. This body and body 47 define a tubular injector 49 through which cable 30 passes and which constitutes an annular nozzle around this cable 30. The two injectors 49 so formed face each other and lead into respective radial chambers 50 one of which is connected to pipe 45 and other of which is connected to pipe 46. Simple telescopic connections 80 and 81 in tubular body 47 and pipes 45 and 46 will accommodate different axial expansions. The cross-section of the tubular body 47 may vary along its length. The tubular injectors 49 and the tubular body 47 may have a non-circular cross-section such as a square or a rectangle with tapering pieces which are truncated pyramids.

Through sleeve 39 and duct 3 at the ends of tubular body 47, inspection holes 51 have been made, allowing for the continuous inspection from the outside of the curing process.

Similarly to duct 3, duct 5 is also fitted with two pipes 52 and 53. Pipe 52 extends downwards from the lower part of duct 5 and connects this duct 5 to the inlet of a pump 54 driven by an electric motor 55 through gearing 56. Pipe 53 extends from the outlet of pump 54 upwards and, after having passed through chamber 18, leads into radial chamber 57 disposed on one of the ends of tubular body 58. Tubular body 58, which is coaxial with tubular body 47, forms a cooling chamber for cable 30. Tubular body 58 is connected, at the other end, to the internal surface of plate 12 at hole 31 and on its upper part there is a radial opening 59 situated near plate 12. Tubular body 58 shows at its end facing plate 15 an internally truncated conical surface flaring towards the outside and coupled to an externally truncated conelike tubular body. This tubular body and body 58 define a tubular injector 60 which faces plate 12. This injector 60 communicates with chamber 57, and provides an annular nozzle around the cable 30. Immediately upstream of injector 60, in duct 5, there is a spyhole 61 which allows for the visual inspection from the outside of the delivery of cable 30 into tubular body 58.

A salt wipe circuit incorporating a nozzle 65 downstream of the curing chamber is provided. This circuit includes a pipe 61' connected to pipe 45 and passing through duct 3 and the heated sleeve 39 to the inlet of pump 62 driven by motor 63. The outlet of the pump 62 is connected by a pipe 64 to a nozzle 65. The nozzle 65 is arranged co-axially with the curing chamber 47 and the cable 30. The nozzle aperture 66 takes the form of a conical annulus or a series of discrete orifices equally spaced around the central passage 67 and directed to converge on the axis of passage 67 and towards the injector 49.

Before starting the curing process, a quantity of heat is supplied to duct 3 via sleeve 39 sufficient to melt a quantity of salt sufficient to occupy a substantial part of chamber 16 underneath tubular body 47. The metal wire which forms the core of cable 30 is passed through ducts 25 and 22, tubular bodies 47 and 58 and annular seal 33, and is then attached to a pulling unit (not shown) which advances the wire continuously along tubular body 2.

Then pressurised gas, usually air or an inert gas is fed through coupling 36 into chamber 17 and passes through holes 19 and 20 to occupy those parts of chambers 16 and 18 not occupied by the molten salt and cooling liquid respectively.

Pump 42 is switched on. This draws the molten salt to the bottom of chamber 16 through pipe 40, delivering it to the two injectors 49 by means of pipes 41, 45 and 46. The molten salt fed by the two oppositely facing injectors 49 invades the entire tubular body 47 overflows through the opening 48 eventually dropping down to the bottom of chamber 16.

At the same time, pump 54 is operated and this draws some cooling liquid, usually water, from the bottom of chamber 18 through pipe 52, delivering it to injector 60 through pipe 53. The cooling liquid fed from injector 60 invades the entire tubular body 58 overflowing through opening 59 and then dropping to the bottom of chamber 18. In order to reduce any contamination of salt by cooling liquid or vice-versa, levels of salt and cooling liquid in the respective chambers 16 and 18 are below apertures 19 and 20 in respective plates 10 and 15. For convenience of operation, the liquids should also be lower than tubular bodies 47 and 58.

Following the feeding of the metal wire through die 28, on this same wire a coating of uncured elastomeric material is directly extruded so as to form a coated cable 30. The cable 30 moving forward along tubular body 2, enters tubular body 47 inside which the above mentioned uncured coating undergoes a curing process under pressure conditions due to the contact with the molten salt which comes out of injectors 49 and to the set pressure inside the tubular body 2 of the gas fed through coupling 36.

Any spray of molten salt coming out of hole 19 drops inside trap 37 from which it can be cleared by the removal of plate 38.

When the speed of the covered cable 30 is raised the spray of salt from chamber 16 and salt adhering to the cable are carried in increasing amounts into chamber 17 and even into chamber 18. The jet of salt from the injector 49 directed in the opposite direction to the direction of motion of the cable reduces the amount of salt carried over into chambers 17 and 18. This effect can be enhanced by increasing the velocity of the salt from the injector 49.

In addition, particularly at very high velocities, contamination of the cooling liquid by the salt, is further reduced by operation of the salt wipe circuit including the nozzle 66. In operation of the circuit, a stream of salt emanates from the nozzle aperture 66 to strike salt adhering to the cable to either prevent or reduce the amount of salt carried out of the chamber 16 with the cable 30.

An additional or alternative salt wipe arrangement to the salt wipe circuit of FIG. 1 is shown in FIG. 2. This figure shows on an enlarged scale an arrangement where a housing 72 is connected through plates 71 and 70 to flange 8 of duct 3 and flange 9 of duct 4. Within the housing is a pulley 73 which diverts the cable 30 through 180°, the cable entering through holes 19 and 74 and leaving through holes 75 and 76. Upstream of the flange 8, and downstream of the flange 9 the apparatus is as shown in FIG. 1. However, that part of the apparatus downstream of flange 9 now extends in the opposite direction to previously. In passing round this pulley a fast moving cable throws off most of the adhering salt which returns to chamber 3 via holes 74 and 19.

Once chamber 18 is reached, cable 30 enters inside tubular body 58 where it cools under pressure due to its contact with the cooling liquid supplied from injector 6. It then issues from annular seal 33.

With regard to duct 3 and tubular body 47, it is to be noted that the heat supplied via sleeve 39 keeps the whole chamber 16 basically at the same temperature. This reduces or eliminates the formation of dangerous thermal stresses in duct 3 and tubular body 47, and maximises the thermal efficiency of the assembly comprising duct 3 and body 47. Sleeve 39, is capable of containing a high temperature fluid, and is one of the many ways by which duct 2 can be heated and it can be replaced, for example, with electric resistances (not shown) arranged outside duct 3. When electrical resistance heaters are used to heat duct 3 separate heating zones for the regions in contact with the salt (bottom) and not in contact with the salt (top) are preferable and cascade temperature control used to ensure that both zones are at similar temperatures. Such arrangements are particularly advantageous during heating up and cooling down operations. These arrangements again minimise strains due to temperature differences.

In order to more efficiently vent any air entrained in the salt injected into tubular body 47 and to ensure that the salt more completely fills the tubular body, the radial opening 48 in the tubular body 47 can be modified to a series of openings 48a and 48b disposed at intervals between the injectors 49 as shown in FIG. 3a. Alternatively, the opening can take the form of an elongated slot 48c on the top of tubular body 47 as shown in FIGS. 3b and 3c. FIG. 3b shows a side sectional elevation of part of the tube 47 and FIG. 3c shows a cross-sectional elevation of the tube 47 along the line X—X of FIG. 3b. A further modification is to fit an upstand 49a round the orifice 48d as shown in FIGS. 3d and 3e. FIG. 3e shows a side elevation of a part of the body 47 and FIG. 3d shows a cross-section through the body 47 along the line E—E of FIG. 3e.

In order that the tubular body 47 can be emptied of salt quickly small vents 79a and 79b can be provided in the bottom of the tubular body 47 as shown in FIG. 3a.

In order to facilitate the threading of the cable 30 through the apparatus, a threading wire can be maintained through the apparatus while the covering of cable 30 is being cured. The threading wire can be attached to the inside of duct 25, passing through duct 22, chambers 3, 4 and 5 emerging through an auxiliary seal adjacent to the main seal. Should the cable 30 break during operation of the apparatus, the broken end nearing the entrance to the apparatus can be attached to the threading wire together with a further wire. Both cable and wires are pulled through the apparatus to a point just short of the seal 33, the cable 30 is detached and pulled through the seal, and the threading wire is pulled back to its original position.

The strains due to variable temperatures in the apparatus are less than in the prior art systems but some still remain. These strains can easily be accommodated by simple means, for example a flexible coupling between flange 23 and the external surface of plate 7 will accommodate angular mis-alignment. A bellows type flexible coupling 82 is illustrated diagrammatically in FIG. 4.

Within the scope of the invention it is possible to make further modifications to the apparatus or plant. For example, one of the injectors 49 could be dispensed with. The cooling system shown in FIG. 1 could be replaced by that shown in FIG. 2 of British Pat. No. 1,486,957.

What is claimed is:

1. Apparatus for curing a continuous length of curable material comprising a first tubular body which defines a chamber for a heat exchange liquid, a second tubular body disposed inside the first tubular body and defining a curing chamber, inlet means leading into the tubular bodies, and outlet means leading from the tubular bodies arranged to permit a length of material to be cured to pass through the tubular bodies, first and second sealing means placed upstream and downstream respectively of the inlet and outlet means and operative to sealingly cooperate with a length of material, at least one tubular injector for injecting a heat exchange liquid into said second tubular body, a nozzle disposed downstream of the or each injector and adjacent the exit from and coaxial with the curing chamber operative to direct heat exchange liquid fed to it against the length of curable material as it leaves the curing chamber in order to strike heat exchange liquid clinging to the material from its passage through the curing chamber from the material, heat exchange liquid supply means for the supply of heat exchange liquid to the or each tubular injector and the nozzle, means for heating at least a part of the first tubular body, means for feeding a pressurised fluid to the first tubular body and means for cooling the continuous cured length of curable material emerging in operation from the second tubular body.

2. Apparatus as claimed in claim 1, in which the tubular injector is disposed adjacent the outlet means of the second tubular body and coaxial therewith.

3. Apparatus as claimed in claim 1, in which there are two tubular injectors oppositely disposed respectively adjacent the inlet and outlet means of the second tubular body and coaxial therewith.

4. Apparatus as claimed in claim 1, in which the or each tubular injector comprises an annular nozzle.

5. Apparatus as claimed in claim 1, in which the second tubular body is disposed in the upper part of the first tubular body so that in operation it lies above the surface of heat exchange liquid contained within the first tubular body.

6. Apparatus as claimed in claim 3, in which the second tubular body defines a radial opening in its upper part at a point intermediate the two injectors.

7. Apparatus as claimed in claim 3, in which the second tubular body defines a radial opening in its upper part at a point midway between the two injectors.

8. Apparatus as claimed in claim 1, in which the means for cooling comprises a third tubular body disposed in the first tubular body downstream of the second tubular body, partitions defining a chamber for a coolant within the first tubular body, which is separated at least partially from the chamber for heat exchange liquid, a tubular injector for injecting the coolant into the third tubular body and coolant supply means for the supply of coolant to the tubular injector.

9. Apparatus as claimed in claim 8, in which the tubular injector is coaxially arranged on the third tubular body.

10. Apparatus as claimed in claim 1, in which the nozzle defines a conical annular outlet.

11. Apparatus as claimed in claim 1, in which the nozzle defines a series of convergent discrete orifices.

12. Apparatus as claimed in claim 1, in which the heat exchange liquid supply means for the supply of heat exchange liquid to the or each tubular injector and the nozzle comprises a first circuit leading from the first tubular body via a first pump to the or each tubular injector and a second circuit leading from the first circuit to the nozzle via a second pump.

13. Apparatus as claimed in claim 1, in which a pulley is disposed downstream of the curing chamber and upstream of the means for cooling around which the continuous length of cured material is drawn in operation of the apparatus to change its direction after being cured but before being cooled so as to subject any heat exchange liquid clinging to the material to a centrifugal force tending to throw it from the material.

14. Apparatus as claimed in claim 1, in which the tubular body defining the curing chamber also includes a series of radial vents for venting any air entrained in the heat exchange liquid therefrom.

15. Apparatus as claimed in claim 1, in which the tubular body defining the curing chamber also includes a slot extending along the top thereof for venting any air entrained in the heat exchange liquid therefrom.

16. Apparatus as claimed in claim 1, in which the tubular body defining the curing chamber comprises an upstand around a radial vent intermediate its ends.

17. Apparatus as claimed in claim 1, in which the tubular body defining the curing chamber also includes a series of drain vents in the bottom thereof.

18. Apparatus as claimed in claim 1, in which a threading cable is disposed through the apparatus for threading a length of material through initially or after a breakage, a seal being disposed adjacent the exit to the apparatus through which the cable may be pulled.

19. Apparatus for curing a continuous length of curable material comprising a first tubular body which defines a chamber for a heat exchange liquid, a second tubular body disposed inside the first tubular body and defining a curing chamber, inlet means leading into the tubular bodies, and outlet means leading from the tubular bodies arranged to permit a length of material to be cured to pass through the tubular bodies, first and second sealing means placed upstream and downstream respectively of the inlet and outlet means and operative to sealingly cooperate with a length of material, at least one tubular injector for injecting a heat exchange liquid into said second tubular body, heat exchange liquid supply means for the supply of heat exchange liquid to the or each tubular injector, means for heating at least a part of the first tubular body, means for feeding a pressurised fluid to the first tubular body, means for cooling the continuous cured length of curable material emerging in operation from the second tubular body and a pulley disposed downstream of the curing chamber and upstream of the means for cooling around which the continuous length of cured material is drawn in operation of the apparatus to change its direction after being cured but before being cooled so as to subject any heat exchange liquid clinging to the material to a centrifugal force tending to throw it from the material.

20. A method of curing a continuous length of curable material including the steps of supplying a heat exchange liquid to a first tubular body, pressurising the first tubular body, heating the heat exchange liquid in the first tubular body, feeding the heat exchange liquid from the first tubular body to an injector, injecting the liquid so fed into a second tubular body disposed within the first tubular body, simultaneously passing the continuous length of material through the second tubular body disposed within the first tubular body so that the heat exchange liquid passes over it, allowing the heat exchange liquid to drain back from the second tubular body to the first tubular body, feeding heat exchange liquid to a nozzle disposed at the exit end of the curing chamber and downstream thereof and directing it therefrom at the length of material leaving the chamber in order to strike heat exchange liquid clinging thereto from its passage through the curing chamber from the material, and subsequently cooling the continuous length of material.

21. A method as claimed in claim 20, in which the heat exchange liquid is fed to two injectors oppositely disposed adjacent opposite ends of the second tubular body and injected therefrom into the second tubular body in two oppositely directed streams to pass over the continuous length of material passing simultaneously through the second tubular body and allowed to drain back into the first tubular body from a position intermediate the two injectors.

22. A method as claimed in claim 21, in which more heat exchange liquid is fed to the injector disposed adjacent the exit end of the second tubular body than to the other injector, in order to reduce or eliminate the amount of heat exchange liquid carried out of the curing chamber by the length of material.

23. A method as claimed in claim 20, in which the length of material is passed around a pulley after exiting from the curing chamber so as to change its direction and subject heat exchange liquid clinging thereto to a centrifugal force tending to fling it from the material.

24. A method of curing a continuous length of curable material including the steps of supplying a heat exchange liquid to a first tubular body, pressurising the first tubular body, heating the heat exchange liquid in the first tubular body, feeding the heat exchange liquid from the first tubular body to an injector, injecting the liquid so fed into a second tubular body disposed within the first tubular body, simultaneously passing the continuous length of material through the second tubular body disposed within the first tubular body so that the heat exchange liquid passes over it, allowing the heat exchange liquid to drain back from the second tubular body to the first tubular body, passing the length of material around a pulley after it exits from the curing chamber so as to change its direction and subject heat exchange liquid clinging to it to a centrifugal force tending to fling it from the material, and subsequently cooling the continuous length of material.

* * * * *